(12) United States Patent
Ristock et al.

(10) Patent No.: US 9,979,737 B2
(45) Date of Patent: May 22, 2018

(54) SCORING PERSONS AND FILES FOR TRUST IN DIGITAL COMMUNICATION

(75) Inventors: Herbert Willi Artur Ristock, Walnut Creek, CA (US); S. Michael Perlmutter, San Francisco, CA (US); Brian Galvin, Seabeck, WA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 648 days.

(21) Appl. No.: 12/346,441

(22) Filed: Dec. 30, 2008

(65) Prior Publication Data
US 2010/0169265 A1 Jul. 1, 2010

(51) Int. Cl.
*H04L 29/06* (2006.01)
*G06Q 10/06* (2012.01)
*G06Q 10/10* (2012.01)
*G06Q 30/06* (2012.01)

(52) U.S. Cl.
CPC .......... *H04L 63/126* (2013.01); *G06Q 10/06* (2013.01); *G06Q 10/0637* (2013.01); *G06Q 10/105* (2013.01); *G06Q 30/06* (2013.01)

(58) Field of Classification Search
CPC .. G06Q 10/06; G06Q 10/0637; G06Q 10/105; G06Q 30/06; H04L 63/126
USPC ........ 707/705, 736, 748; 709/238, 239, 240, 709/206
See application file for complete search history.

(56) References Cited

U.S. PATENT DOCUMENTS

| | | | |
|---|---|---|---|
| 6,105,027 A * | 8/2000 | Schneider et al. | 709/206 |
| 6,335,927 B1 | 1/2002 | Elliott et al. | |
| 6,493,447 B1 | 12/2002 | Goss et al. | |
| 6,801,899 B2 | 10/2004 | Lauffer | |
| 6,823,384 B1 | 11/2004 | Wilson et al. | |
| 7,209,549 B2 | 4/2007 | Reynolds et al. | |
| 7,519,542 B1 * | 4/2009 | Waingold | 705/7.11 |
| 7,590,693 B1 * | 9/2009 | Chan et al. | 709/206 |
| 7,603,350 B1 * | 10/2009 | Guha | 707/5 |

(Continued)

FOREIGN PATENT DOCUMENTS

| | | |
|---|---|---|
| EP | 1 244 322 A1 | 9/2002 |
| EP | 1244322 B1 | 6/2005 |

(Continued)

OTHER PUBLICATIONS

International Preliminary Report on Patentability for International Application No. PCT/US2009/068410, date of issuance of report Jul. 5, 2011, 5 sheets.

(Continued)

*Primary Examiner* — Marc Somers
(74) *Attorney, Agent, or Firm* — Lewis Roca Rothgerber Christie LLP

(57) ABSTRACT

A method, using trust software executing from a machine-readable medium on a computerized appliance operating as a trust authority, to assign to a person, a file, or an enterprise an indication of trustworthiness, includes steps of (a) assembling information concerning the person, file, or enterprise; (b) applying trust logic to the information assembled for individual ones of the persons, files or enterprises to assign a trust score; and (c) storing the score associated with at least an identity of the person, file or enterprise.

30 Claims, 6 Drawing Sheets

(56) References Cited

U.S. PATENT DOCUMENTS

| | | | |
|---|---|---|---|
| 7,679,640 B2 | 3/2010 | Eshkoli et al. | |
| 7,822,631 B1* | 10/2010 | Vander Mey et al. | 705/7.29 |
| 7,852,831 B2 | 12/2010 | Akbar | |
| 8,325,215 B2 | 12/2012 | Ristock et al. | |
| 8,756,326 B1* | 6/2014 | Elberse | H04L 67/02 709/219 |
| 8,805,844 B2 | 8/2014 | Schorzman et al. | |
| 2003/0030680 A1 | 2/2003 | Cofta et al. | |
| 2003/0156707 A1* | 8/2003 | Brown | H04M 3/42 379/265.06 |
| 2003/0177392 A1 | 9/2003 | Hiltgen | |
| 2004/0088172 A1 | 5/2004 | Baglioni | |
| 2004/0249705 A1 | 12/2004 | Spencer et al. | |
| 2005/0163302 A1* | 7/2005 | Mock | A61B 5/165 379/211.02 |
| 2005/0256866 A1* | 11/2005 | Lu | G06F 17/30867 |
| 2006/0031510 A1 | 2/2006 | Beck et al. | |
| 2006/0168021 A1 | 7/2006 | Levin et al. | |
| 2006/0168022 A1 | 7/2006 | Levin et al. | |
| 2006/0182029 A1 | 8/2006 | Kealy et al. | |
| 2006/0190475 A1 | 8/2006 | Shi | |
| 2006/0206713 A1* | 9/2006 | Hickman et al. | 713/176 |
| 2006/0244818 A1 | 11/2006 | Majors et al. | |
| 2007/0005515 A1 | 1/2007 | Rosenberg | |
| 2007/0005713 A1 | 1/2007 | LeVasseur et al. | |
| 2007/0019617 A1 | 1/2007 | Hancock et al. | |
| 2007/0030824 A1 | 2/2007 | Ribaudo et al. | |
| 2007/0061734 A1* | 3/2007 | Abdulhayoglu | 715/742 |
| 2007/0076853 A1* | 4/2007 | Kurapati et al. | 379/1.01 |
| 2007/0081522 A1 | 4/2007 | Apelbaum | |
| 2007/0106741 A1* | 5/2007 | Christoff et al. | 709/206 |
| 2007/0130464 A1 | 6/2007 | Swedor et al. | |
| 2007/0160054 A1 | 7/2007 | Shaffer et al. | |
| 2007/0168511 A1 | 7/2007 | Brochu et al. | |
| 2007/0180495 A1 | 8/2007 | Hardjono et al. | |
| 2007/0203852 A1 | 8/2007 | Cameron et al. | |
| 2007/0203997 A1 | 8/2007 | Ingerman et al. | |
| 2007/0208727 A1* | 9/2007 | Saklikar et al. | 707/4 |
| 2007/0294415 A1 | 12/2007 | Kelder et al. | |
| 2008/0022389 A1* | 1/2008 | Calcev et al. | 726/14 |
| 2008/0027747 A1 | 1/2008 | McGovern et al. | |
| 2008/0034040 A1 | 2/2008 | Wherry et al. | |
| 2008/0052509 A1 | 2/2008 | Ahmed | |
| 2008/0059198 A1 | 3/2008 | Maislos et al. | |
| 2008/0077461 A1* | 3/2008 | Glick | 705/7 |
| 2009/0106556 A1 | 4/2009 | Hamid | |
| 2009/0172776 A1* | 7/2009 | Makagon et al. | 726/2 |
| 2010/0056195 A1 | 3/2010 | Nixon | |
| 2010/0076987 A1 | 3/2010 | Schreiner | |
| 2010/0080378 A1 | 4/2010 | Katz | |
| 2010/0165887 A1 | 7/2010 | Ristock | |
| 2010/0169265 A1 | 7/2010 | Ristock et al. | |
| 2010/0169430 A1 | 7/2010 | Ristock et al. | |
| 2010/0169499 A1 | 7/2010 | Ristock et al. | |
| 2010/0169641 A1 | 7/2010 | Ristock et al. | |
| 2011/0055207 A1 | 3/2011 | Schorzman et al. | |
| 2012/0096141 A1 | 4/2012 | Narjala | |
| 2013/0145432 A1 | 6/2013 | Ristock et al. | |
| 2015/0121460 A1 | 4/2015 | Ristock et al. | |
| 2015/0156145 A1 | 6/2015 | Davitz et al. | |
| 2016/0012215 A1 | 1/2016 | Ristock et al. | |
| 2017/0118175 A1 | 4/2017 | Ristock et al. | |

FOREIGN PATENT DOCUMENTS

| | | |
|---|---|---|
| EP | 1691538 A1 * | 8/2006 |
| EP | 1 827 045 A1 | 8/2007 |
| EP | 1827045 A1 | 8/2007 |
| WO | 2007048251 A1 | 5/2007 |
| WO | WO 2007/048251 A1 | 5/2007 |
| WO | 2008148819 A2 | 12/2008 |
| WO | WO 2008148819 A2 * | 12/2008 |
| WO | 2010078012 A2 | 7/2010 |
| WO | WO 2010/078012 A2 | 7/2010 |

OTHER PUBLICATIONS

Written Opinion of the International Searching Authority for International Application No. PCT/US2009/068410, Jun. 30, 2011, 4 sheets.

International Search Report for International Application No. PCT/US2009/068410, Mailed Aug. 9, 2010, 3 sheets.

International Preliminary Report on Patentability and Written Opinion for PCT/US2009/068410, dated Jul. 5, 2011, 5 pages.

International Search Report for PCT/US2009/068410, mailed on Aug. 9, 2010, 3 pages.

* cited by examiner

SCORING PERSONS AND FILES FOR TRUST IN DIGITAL COMMUNICATION

CROSS-REFERENCE TO RELATED APPLICATIONS

The present application is related to a prior U.S patent application No. 11/967,550, filed on Dec. 31, 2007, the disclosure of which is incorporated herein by reference.

BACKGROUND OF THE INVENTION

1. Field of the Invention

This invention is in the field of digital communication, and pertains more particularly to systems, hardware and software for aiding participants in communication to decide whether, and to what extent to trust other participants in communication and interaction.

2. Description of Related Art

An object of the present invention is to apply and manage concepts of trust in computerized processes. Trust, however, is not an attribute of machines such as computers, but a complicated and not completely understood attribute of human cognition and emotion. People, in interaction with other people, and also with other animals and machines, especially computerized machines, in order to function smoothly in the world, are obliged to accomplish an almost continuous flow of decisions. Although in the flow of thought for a person, such decisions are not always posed as distinct questions with distinct answers, for purposes of this discussion the decision process can be illustrated in that way. Consider two persons in conversation about almost any subject. In the back-and-forth flow of such conversation, each party has to be asking himself/herself what should I tell this person? Can I answer that question truthfully? What might be the consequences of telling this person this particular nugget of information? How well do I know this person? Has this person been truthful with me in the past? Has she kept my confidence? Can I trust her?

Every question/answer, although typically not posed in the flow of thought as a distinct question to be answered, is a step in the process of trust, and the exchange of information, or deal struck, will be shaped by the answers each person in the conversation makes to these, and other hypothetical questions. In an extreme case of distrust, one person might simply cut off the conversation, or, in another instance of complete trust, divulge a large amount of very sensitive information.

Going beyond personal conversation between people in the same room, and not employing special equipment, consider people in more remote conversation, such as by telephone. Depending on the type of telephone system and equipment used, and also on the purposes of the communication, there may be a considerable variety of typically computerized equipment involved. A person placing a call to another over a connection-oriented switched telephony (COST) system, which is a term in telecommunications art for what is also known as the "plain old telephone system" (POTS), will be using a telephone connected through a local switch, which may be computer-telephony integration (CTI) enhanced (or not), and the call may be routed over trunk lines and intermediary switches, which may be enhanced with computer functionality, to telephony equipment at the recipient's end. The purpose of such a telephone call may be a conversation between friends, or it may be a call to a person offering something for sale, or a call to a toll-free number to reach, hopefully, and agent at a call center, to seek service or information in one matter or another.

At various termination points in such a call set up there may be opportunities to record all or part of the voice exchanges. There may be uncertainty about who the person at the other end says he is. There may be questions about the competency or skill of an agent to whom one is eventually connected. There are trust issues in all of these situations and examples, and more.

Very similar issues abound in other forms of communications and transaction situations, such as email, chat sessions, Internet sales, on-line banking, remote investment management over all sorts of networks, and much more.

An object of the present invention is to teach systems, methods and means by which trustworthy transaction may be encouraged, promoted and secured, and by which untrustworthy transaction may be avoided. Means are taught in various embodiments of this invention to use intelligence at various points in networks and network apparatus to aid participants in managing their personal trust issues in communication and transaction, and to aid enterprises in managing their trust issues as well. Methods and apparatus are taught as well for scoring persons and files to represent trustworthiness in communication.

BRIEF SUMMARY OF THE INVENTION

The present inventors, having considered needs for trust in digital communications, have addressed the needs with unique methods. Accordingly in one embodiment of the present invention a method, using trust software executing from a machine-readable medium on a computerized appliance operating as a trust authority, to assign to a person, a file, or an enterprise an indication of trustworthiness is provided, comprising steps of (a) assembling information concerning the person, file, or enterprise; (b) applying trust logic to the information assembled for individual ones of the persons, files or enterprises to assign a trust score; and (c) storing the score associated with at least an identity of the person, file or enterprise.

In another aspect of the invention a trust scoring system is provided, comprising a computerized appliance operating as a trust authority, executing trust software from a machine-readable medium, a data repository coupled to the computerized appliance, and one or more ports coupling the computerized appliance to one or more networks. The appliance assembles information concerning a person, a file, or an enterprise, applies trust logic to the information to determine a trust score, and stores the score determined in the data repository associated with at least an identity of the person, file or enterprise.

BRIEF DESCRIPTION OF THE DRAWING FIGURES

DETAILED DESCRIPTION OF THE INVENTION

The present invention relates in many important aspects to interactions between persons who may be termed customers or clients, and businesses that offer and provide products and services to the customer/clients. This is not the only arena in which trust, as defined and taught in the specification, is useful or unique, but is a very important segment, so the descriptions of customer to business relationships and communication are not meant in any way to be limiting, but are used in many descriptions of embodiments of the invention herein.

In most cases the business side of interactions will be handled by agents of a business enterprise, which agents may be computerized agents, such as provided by an interactive voice response (IVR) system, or persons acting in some manner on behalf of one or more of the enterprises. The interaction may be by voice telephone, by texting, by email, by Internet-enabled chat sessions, or in any other manner known in the art that provides communication between customers and agents.

Figure 1:
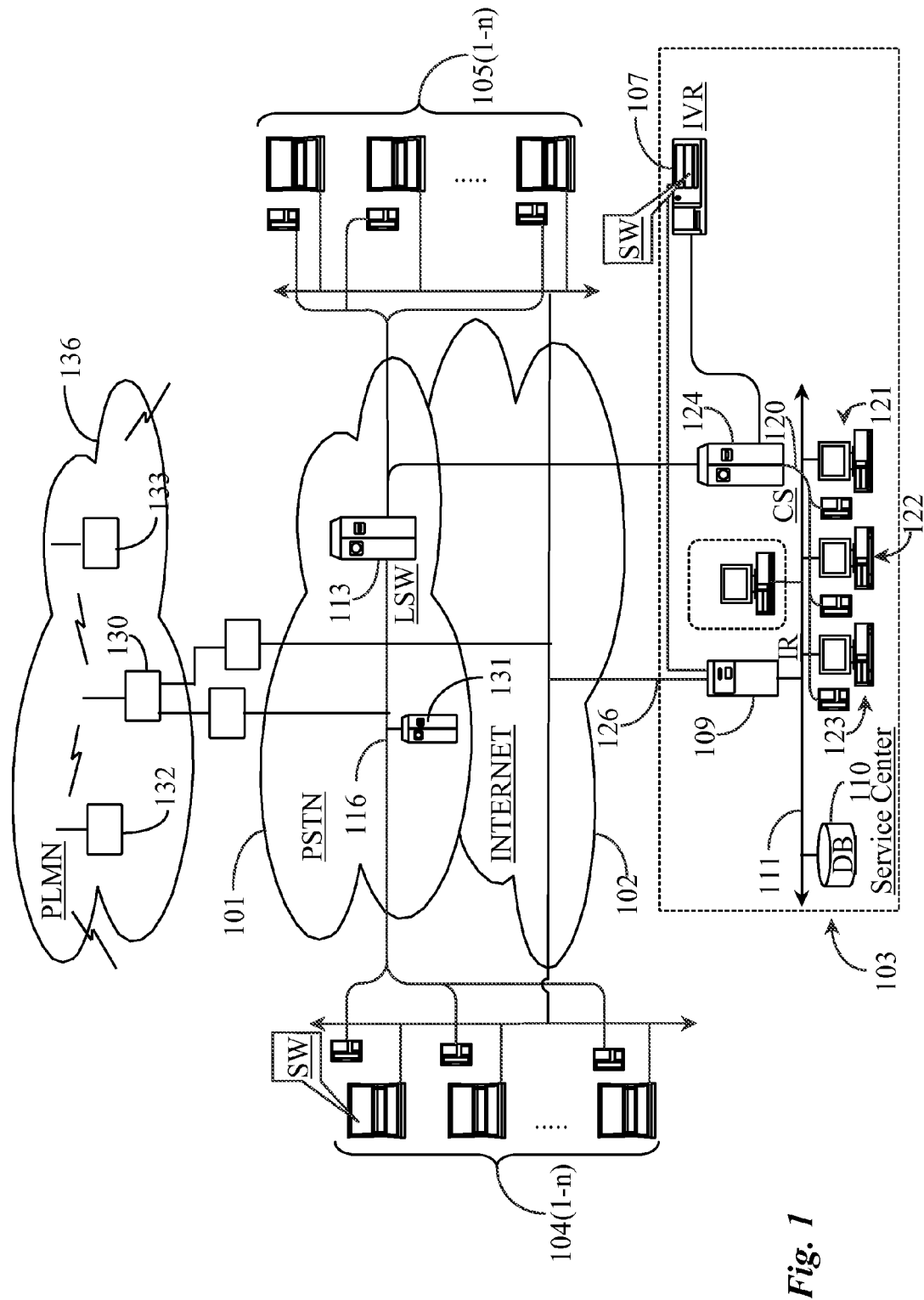
FIG. 1 is diagram illustrating a dynamic and integrated communication network through which trust issues may be managed.

FIG. 1 is an architecture diagram of a network consisting of interconnected, specific networks, over which customer-to-business communication might take place, as well as any sort of digital communication between two or more persons, and is provided for reference in this specification to specific apparatus supporting communication in descriptions that follow. A public Switched Telephony Network 101 is indicated as a cloud within which line 116 represents all connection trunks and lines within the PSTN. A local switch LSW 113 is represented in the PSTN network to represent a plurality of switching apparatus in such a network, through which PSTN calls may be connected and routed.

Also shown in FIG. 1 is a public land mobile network (PLMN) 136 which is a well-known wireless network supporting mobile communication appliances, such as cellular telephones, which may be used by customer persons and agent persons as well in some embodiments. The wireless appliances used by persons connect by RF transmission to antenna stations 130, 132 and 133 in this example, depending on the geographic location of the person making or receiving a transaction using a wireless appliance. The antenna stations communicate with one another using a network protocol, such as GSM (Global System for Mobile Communications) and one or more stations (station 130 in this example) in the network is typically enabled with a Base Station Controller (BSC), which manages location, network metrics and call placement, among other functions. Reference is made for further detail to the European Telecommunications Standards Institute (ETSI), particularly specification TS 100 522 V7.1.0 (2000-01).

Stations 104(1-n) represent customer premises equipment used by individuals, which may or may not be customers of certain enterprises. Each of these stations is shown as comprising a computer connectable to Internet 102 and a telephone device shown connected to PSTN 101. The telephone devices may, however, be communication appliances enabled to practice, either through the local computer connected to the Internet, or through separate Internet connection, voice over IP (VoIP) or what is sometimes called Internet Protocol Network Telephony (IPNT). In other embodiments telephone devices may be wireless appliances communicating through a wireless network as indicated by base station 130.

A Web server 131 is shown connected to backbone 116 in the Internet, and represent the very large number of Internet-connected servers that may serve Web pages to persons connected to the Internet through enabled devices, such as the computers at stations 104.

One enterprise communication center 103 is illustrated in FIG. 1 to represent a very large number of such centers that provide product sales, information and services to customers through network communication. These enterprises include such as insurance companies, maintenance and service centers for wireless telephone companies, service centers for companies selling digital products, and the like. Typically, many or most such enterprises will also maintain a web service (such as 131) for customer communication and also for marketing and sales.

Center 103 has an Internet-connected server 109 connected by line 126 for handling and managing IPNT telephony, and may be assumed to also route such events. The call center also comprises a PSTN-capable switch 124 for receiving, managing and routing PSTN calls, and in some instances this switch may be CTI-controlled. There are also agent stations 121, 122 and 123 each having a computer connected on a Local Area Network 111, with each also having a telephone device, shown connected to PSTN-capable server 124 via line 120, but which also may be IPNT-connected or wireless. There is a data repository 110 in the communication center, representing many such repositories either in or accessible to the call center, which may also store software executed from the repository by various computing devices and servers coupled in the communication center. There is in addition an Interactive Voice Response (IVR) server 107 for interactive voice response with callers.

Three remote agent stations 105(1-n) are illustrated, representing a plurality of stations used by persons who are agents for the host enterprise, but who do not work at the physical location of the communication center. Each of these stations also has a computer and a telephone device, which may be, as described for other stations above, enabled through the PSTN, the Internet or wirelessly.

It will be apparent to the skilled person that the interconnected networks shown in FIG. 1 may be connected and implemented in a variety of other ways. For example, there may be a gateway between the Internet and the PSTN such that communication events originating in either network may be propagated to and routed through the other. FIG. 1 is meant to represent the many and variant paths through which network-enabled persons might communicate all across the globe.

The present invention is about trust, trust metrics, and unique ways that trust may be implemented and managed in network communication. It may be helpful to create at this point some context regarding trust in network communication. There are a variety of ways that trust is presently used in the art. It will be familiar to the skilled artisan that frequently, a person browsing the Internet may get a pop-up message to the effect that a web site for which that person has asserted a Universal Resource Locator in a browser application does not display a proper certificate. Such a message typically comes with an interrogatory: "Do you wish to connect anyway?" This is an application of trust. In this case there is a trust authority, generally denoted TA hereinafter, the TA connected to the Internet and to which the person's browser might subscribe, that issues registration for Internet sites (servers, web pages). Supposedly, if the person has subscribed to such a service, that person believes they may "trust" sites that are registered, and may practice more caution with sites that are not registered. Such a trust authority may be considered to issue a trust certificate to the site, and the site may "display" the certificate.

In another example familiar to many in the Internet world, there are many social and business networking sites to which persons may associate. Typically a person may be invited to become a member of such a site by a person that is already a member, or the person may navigate to an interactive interface for the site and "join". As a member of such a site one may associate with other members in a manner, for example, as "contacts". The person joining by invitation will, for example, be associated as a contact with the person inviting. The person inviting may have a plurality of contacts already, so, as a member, a personal page may be displayed showing the number of each of the person's contacts (the inviter and the new person). The personal page for the person who just joined would have 1 contact (assuming that person was invited), and the person who invited might show, say, twenty contacts. The person who just joined may see the inviter's number of contacts, but may not be able to see them listed by name and profile. This is a trust issue.

Contacts that are listed for a person that is a contact for you, are not first order contacts for you, but second order contacts. That is, there are definable degrees of separation. In an embodiment of the present invention, each, or at least individual ones of the members may have access to an interactive configuration display where they may enter whether a contact may view their other contacts, and there may additionally be configuration for "depth" of trust. So a member may, for example, configure that all members may see my own contacts, or just my first order contacts, and so on.

Important to the present discussion is the matter of levels of trust, which is what is illustrated by the configuration facility described above, where a person may elect to display his/her contacts to the entire membership, to a network within the network of the membership, to just first order contacts, or to no one. The inventors term this functionality "trust propagation".

Trust in a sense of human emotion is a social and biological matter. In the sense of trust in network communication, trust is a matter of technology. To manage trust in network communication it is necessary that there be a trust authority, that is, a network connected facility executing software, and with access to information, that is facts, relative to communicants, which data may be stored in a local data repository.

Figure 2:
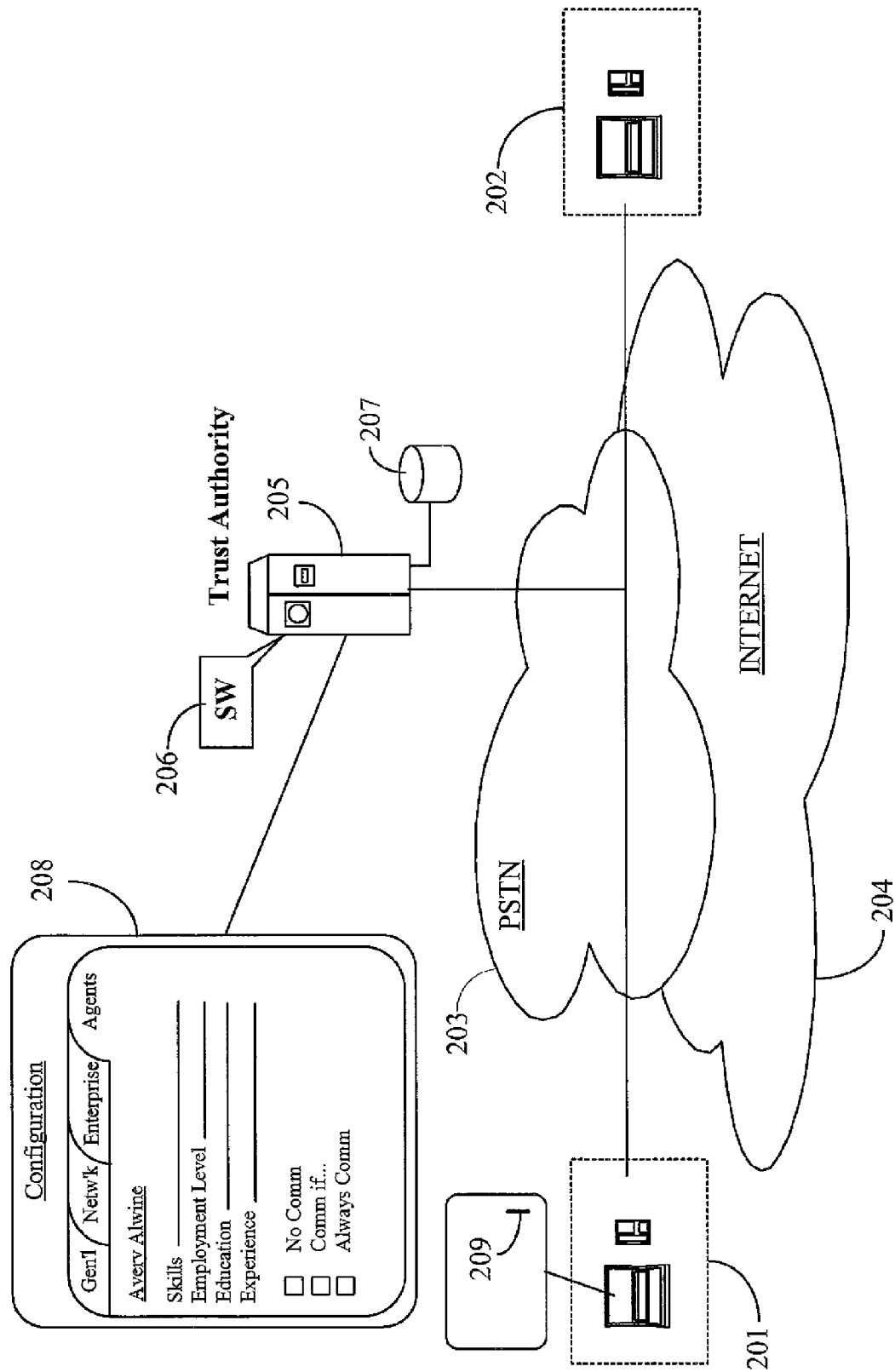
FIG. 2 is a diagram illustrating a trust authority operating on behalf of an independent person in an embodiment of the invention.

FIG. 2 is a simple diagram representing two workstations 201 and 202, which may be used by two persons to communicate over PSTN and/or Internet networks 203 and 204, showing also a server 205 coupled to the network acting as a trust authority. Communication between 201 and 202 may be through either network, or both in some order, or through a wireless network into or out of each of the other networks. FIG. 2 is meant to represent any network connectivity between the two stations 201 and 202. Trust authority 205 executes software 206 from a machine-readable medium 207, which is also a data repository.

In one aspect the communication between a person at station 201 and another person at station 202 may be between two friends at their respective residences. In another it may be a customer of an enterprise at 201 communicating with an agent of the enterprise at 202 (see FIG. 1). In one aspect trust authority 205 may be hosted by the enterprise (not too much trust there for the caller), and in another, it may be an independent authority perhaps subscribed to by both the enterprise and the customer. In yet another embodiment trust authority 205 may be a social trust network, which is described in more detail specifically below.

An important consideration is that trust is highly individual and independent. It is in this specification considered a technical creature of a human emotion. So the trust that issues that may be functional for the person at 201 may be completely independent of the trust issues functional for the person at 202. Each may subscribe to the same trust authority, but more likely may subscribe to a separate and independent trust authorities (here we have to consider the trust that one may have in a trust authority). So in this case there may be two trust authorities 205 connected to the network, and in one aspect the trust authority for the person/station 201 may be operable on station 201. The same might be true at station 202. In yet another aspect there may be a trust application executable at station 201 which cooperates with an independent authority in the network, and the same (or not) at 202. But in any case, to make use of trust as a technical metric, there needs to be a trust authority operating on behalf of station/person 201 and another perhaps operating on behalf of station/person 202. But it should be noted that it is perfectly possible for just one (either one) of the stations to be enabled for trust functionality in communication with a trust authority.

As an example, consider that the independent person at station 201 subscribes to a trust authority 205, and initiates a communication with an agent of an enterprise at 202. Trust may be many-faceted for the person at 201, even in a single transaction session with an agent at 202. For example, what might be the level of trust for the enterprise hosting the center at which station 202 is an agent station? What are the trust metrics associated with the network itself, or different portions of the network? A person may trust a PSTN connection more readily than an Internet connection, for example, or vice-versa. Then what is the trust level relative to the particular agent with which the person is transacting? It actually goes further, for the person may have, or want to express different levels of trust depending on such as skill sets. The person may trust the agent for certain purposes if the agent is certified in certain skills by the trust authority, or by a third authority. For example, the person may be seeking help with a federal tax matter, and the agent may be a certified and licensed CPA or tax attorney (or not).

To deal with these and other issues the trust authority for person/station 201 needs data and information about the enterprise and agents in the enterprise, and there needs to be a configuration interface for the person to provide to the trust authority a set of trust rules for the authority to follow for that person. So assume that authority 205 has, as an example, information about the enterprise, such as opinions of trade organizations, perhaps ratings provided by trade organizations and others, opinions of persons who have dealt with the enterprise, and data, such as financial performance, stock market performance (if any), and agent data, such as a listing of agents who are certified by the enterprise as agents for the enterprise, and associated with each of these agents the authority has normalized data about the agents. Such data may comprise agent skills, such as language skills, certifications, licenses, education level, length of service for the enterprise, whether or not a full-time employee or a part-time employee, perhaps whether the agent is a remote agent as opposed to an in-house agent, and so forth.

Trust, as was mentioned above, is a personal issue. Some people are very trusting, some are paranoid, and most fall somewhere between the extremes. So all of the facts about an enterprise, a network and agents associated with an enterprise, do not equate to a trust level for a person at station 201. It is needed that the person apply his/her own assessments to the data, which, in one embodiment of the invention may be applied as a rule set. In one embodiment authority 205 provides a configuration interface 208 to station 201, useful for configuring, for a particular person, trust level to be applied in various circumstances and relative to various entities (networks, enterprises, individual agents).

There are a broad variety of conditions and relative reactions that may be offered and selected through interface 208, and only a few are shown. An assumption is made in this example that the person at 201 is interested in configuring personal trust metrics in regard to a specific enterprise, and interactive interface 208 shown in FIG. 2 shows several tabs for different subject matters, such as General, Network, Enterprise and Agents. The Agent's tab is open. Typically interface 208 will be provided on the person's computer at station 201, but this is not limiting. Such an interface may be accessed and used on a cellular telephone, a Personal Digital Assistant (PDA), or on any other network-connectable appliance that has the I/O to interact with the interface.

The Agents tab in interface 208 provides information for the person at 201 about agents associated with the particular enterprise, such as skills, education, licenses, and the like. There may be much more information available than that shown as an example in FIG. 2. There is also shown a series of check boxes allowing the person to select to blacklist an agent (No Comm.) for no communication, white list (Always Comm.) for always communicate, or to provide conditions for communication with that agent. In one embodiment there may be selections for agents in general with conditions, such as, for example, "No communication if a part-timer" and the like.

Trust authority 205 may be an independent authority, perhaps Internet-connected and enabled, and may provide trust metrics relative to a broad variety of enterprises, and here enterprises is meant in a very general sense. Authority 205 may collect and store information, and provide configuration options, for government agencies, business entities, specific call centers for business entities, social networks, even for other trust authorities. In one aspect much such information may be provided to authority 205 by subscription with enterprises, that is from the enterprises voluntarily. Certain advantages may be offered by the trust authority (itself an enterprise for purposes of this specification), such as referrals to individuals and other businesses, ranking as trusted sources for various purposes and the like. In this aspect the trust authority may issue trust certificates, which are electronic certificates providing essential information about the enterprise, and trust specific for the enterprise. So the person at 201, interested in contacting a specific enterprise, may request a trust certificate for that enterprise, and if that certificate is lacking, choose to do business with an alternative enterprise. In some embodiments transaction may be made through the trust authority. In others, the trust authority may monitor the person's activity, and provide trust information in reaction to the person's communication activity.

In another aspect trust authority may be enabled to perform trust auditing. By this is meant investigation of an enterprise, collecting information regarding the enterprise from the enterprise itself and from other sources, comparing information, and rendering specific about trustworthiness of the enterprise. The auditing process may be a part of the maintenance of information about enterprises, and agents associated with enterprises, that the authority might use at other times with other functionality.

In another aspect a person, such as a person at station 201, through subscription to authority 205, may be provided services for building trust metrics (which includes distrust) through regular interaction. Such a service provided by authority 205 might track some or all of a person's communications, note the enterprises and other persons with which the person connects, build a history, and provide interactivity for the person to configure trust metrics associated with past contacts for future purposes. There may be in the configuration process ability for the subscribing person to "flesh out" details about persons and enterprises in the history, and the authority may provide standard and normalized formats for such interaction and information building, and for uses for the information.

As an example of interactivity described just above, the trust authority might provide a "communication life" environment for a person's communication activities. The trust authority in this embodiment monitors all of the person's communication activity, or at least that part authorized by the person, and builds a history. The authority knows how many time you spoke to Grandma in the past month, and also how many times you were contacted by spam communications. It provides an input interface for the person to elaborate on specific communication events, as well. And provides, most importantly, and input for the person to easily rank communications for trust. The input might be a pop-up on the display of the communication appliance, and might be as simple at disconnect as Trust? Distrust? Or it might provide a more graded input, such as an ascending trust score. Then every time the person communicates with that communicant again the old score may be displayed, which can be easily edited (or ignored).

One input that is important in the present discussion, and operable through the trust authority, is propagation of trust. The notion of contacts, somewhat as described above relative to a network like Linkedin®, is important here. As a person, monitored by trust authority 205, transacts with communicants, these communicants may be tagged as Contacts for the person. Other persons and agents in enterprises may also have tagged contacts. Propagation may be implemented as to what level trust may be extended. For example, if a trust one of my contacts implicitly, a very high trust score, then I may input that I will also, at least immediately, trust first-order contacts of that person. Maybe even second-order contacts, and so on. The same is true of very low trust scores. If I highly distrust a contact, then I may want to distrust all contacts of that person as well.

It has been described several times above that trust is a highly personal thing. There are some actions, gates and the like that may be managed automatically by computerized functionality for a person in response to recorded trust metrics. For example, white-listing or black-listing, but in a larger sense, a person in real-time communication is going to be making serial decisions, such as "I want to order one, but do I trust this source enough to order six?" So an important functionality of trust authority 205 will be to communicate to the person at station 201 what is the instant trust level in near real time. This metric may be determined in a variety of ways, and may be communicated to the subscriber in a number of ways as well.

It was described above that all of this interactivity with trust authority 205 may be related to the person placing a call or initiating another sort of communication (email, IM and the like), but the trust functionality is not limited to the person being the caller. The same or similar functionality may accrue for incoming communications as well. For example, when a voice call comes in there will be ring tones, and in some cases voice mail if the person is temporarily unavailable. There will be some delay in answering the call or other message for the person at station 201. During this time trust authority 205 may ascertain an initial trustworthiness indication for the caller, and this may be displayed for the person, much as caller ID is accomplished. In one embodiment the ping to a trust authority and the caller ID may be integrated, and may be a function of a public or private network. So you, dear reader, receiving a call from an agent at an enterprise, say a stock broker, will get an initial indication of whether this caller is legit, or this is a spam call.

The indication that the trust authority provides for incoming calls may be a trust certificate, or a simple icon or meter bar, perhaps in green for OK and red for not OK. Such an indicator is discussed more fully below. Similar functionality may pertain to text messaging of all sorts, so an incoming message might be paired with a trust certificate or other trust indicator. Emails ditto. In some cases the trust functionality may be integrated with an email client, a text messaging client, a peer-to-peer telephony system, and the like. In one embodiment an email client is provided, comprising software stored on a machine readable-medium and executing on a network-connected computerized appliance having a display, the software, in response to user initiation, providing a composition window in the appliance display for composing an email, including a "To" field indicating a destination for the email. Upon a user entering an address in the "To" field, the computerized appliance is caused to interact through the network with a server acting as a trust authority, to ascertain trustworthiness of an enterprise or agent associated with the "to" address entered.

Similarly many other sorts of communication software operable at a user's computer, such as station 201 in FIG. 2, may be integrated with functionality to interact over a network, such as the Internet network, with a trust authority, which is enabled to return information about an enterprise, an agent or another person, relative to whether that enterprise or person may be trustworthy. Some such software modules that aid persons in communication include email clients, as described above, Short Message Service (SMS) software, and other software enabling texting communication, such as for 10 cellular telephones, peer-to-peer telephony software, such as Skype®. In some embodiments there may be a software module at the computer in a station such as station 201 that works in concert with a telephone system, either wireless, IPNT or conventional switched land-line systems, such that the user making or receiving a call will activate the software module to interact with a remote trust authority to provide information about enterprises and persons associated with numbers dialed. To accomplish this functionality in some cases a landline telephone may be coupled to the computer appliance, so the computer appliance has the prerequisite information to respond. In the case of a wireless telephone, used at or near a computer appliance, the computer appliance may have a module for monitoring the wireless frequency to scrape the necessary information, such as number called.

In one embodiment a communication software module executing on a computerized appliance from a machine-readable medium is provided, comprising functionality enabling a user to direct a communication event to a particular destination by an address of the destination, functionality for transmitting the destination address to a remote trust authority, functionality for initiating the communication event, and functionality for receiving trust information from the remote rust authority, the trust information associated with an enterprise or a person associated with the destination address. The module may be one of an email client, and the destination address is entered into a "to" field in a window for preparing an email to send, a texting module providing an interactive interface for a user to indicate an addressee and text to send to the addressee, a peer-to-peer telephony module providing an interactive interface for a user to enter a destination address and to initiate a data network telephony event, or a module that tracks user input into a telephone apparatus separate from but coupled to the computerized appliance, the user input asserting a telephone number.

In one embodiment a method for indicating trust in communication is provided, comprising steps of (a) executing a communication software module from a machine-readable medium on a computerized alliance, the module enabling a user to direct a communication event to a particular destination by an address of the destination, and to initiate the communication event; (b) transmitting the destination address to a remote trust authority; and (c) receiving from the remote trust authority trust information about an enterprise or a person associated with the destination address.

In the sense of the trust authority determining the instant trust state, assume the subscriber has initiated a voice call with a call center, and the call is in a queue at the center to be distributed to an agent. The trust authority may have determined at this point that the enterprise hosting the call center is who they say they are, and is also is a reputable enterprise. The authority may have also determined that the network is reliable, and there are no "funny" connections, or listening devices. So these aspects are OK and trust is OK. The authority may provide, in the case of the subscriber communicating from her computer, a green indicator (trust thermometer) that says, and is understood by the subscriber "everything in this transaction is trustworthy". Such an indicator is indicated relative to the subscriber's computer in FIG. 2 as indicator 209. At some point the event in queue gets routed to an agent, and the authority identifies the agent, which happens to be an agent marginally trusted. The indicator turns yellow (Caution). Or the agent is identified as an untrusted agent (as defined by the person herself). The indicator turns red. The person has now a real-time indicator to help her in her ongoing string of decisions during the communication.

In another aspect the person may be using the telephone at the workstation. The indicator may still be applied to the computer display. In another aspect there may be an indicator in a display of the telephone, assuming the telephone has a display, and most do now. If no display, there may be an audio alert, for example a low hum, or any predisposed audio alert that the authority and the subscriber have agreed to in advance, that the subscriber can recognize as a trust-level indicator.

In another aspect of the invention, still related to the independent person at station 201 trust authority 205 may be a social trust network. In this case a plurality of persons, hopefully a relatively large number, may all be subscribers to authority 205, and the authority may provide an interface for the members to rate enterprises and agents of enterprises, such as immediately after ending a communication. In one embodiment the interface, or an offer of the interface, would be made by the authority each time the member disconnects from a voice call, ends a chat session, responds to an email, and so on. The authority in this embodiment builds its database in useful interaction with its members.

In many cases trust authority functionality will be provided using a distributed approach, wherein a version of the trust authority software may be resident on the member's computer, and execute from a machine-readable medium accessible to the person's computer, which local version is compatible with and interacts with software executing at the trust authority from a machine-readable medium accessible to the trust authority.

Figure 3:
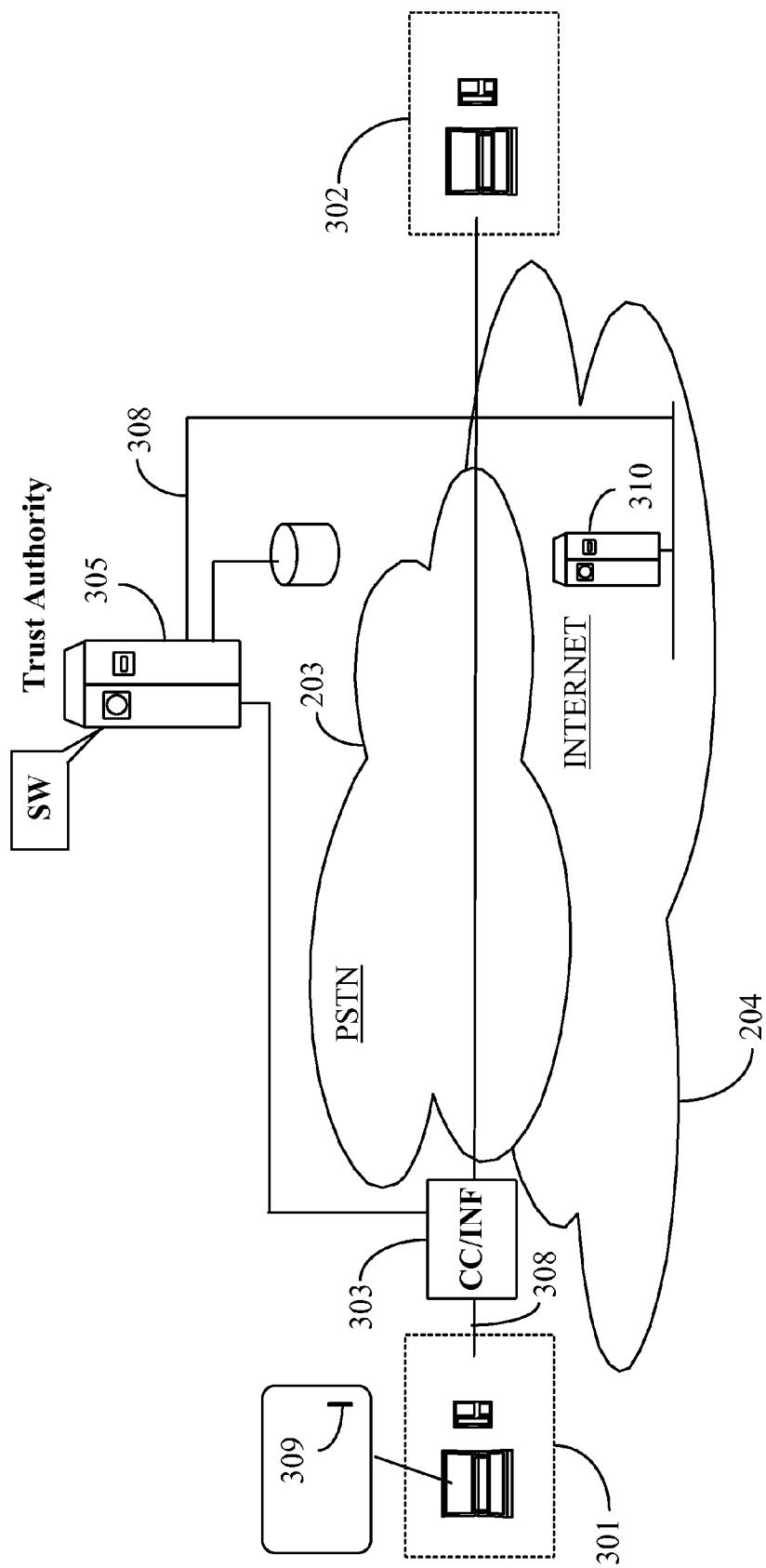
FIG. 3 is a diagram indicating a trust authority operating on behalf of an agent for an enterprise in an embodiment of the invention.

The descriptions above for embodiments of the invention pertain primarily to trust in digital communication as it pertains to independent individuals, such as persons using equipment in their homes, who might be, for example, be communicating with other individuals, or with agents of a call center hosted by an enterprise, or with other persons acting as agents of an enterprise. In another aspect trust may be managed for a person acting as an agent for an enterprise. FIG. 3 illustrates a trust authority acting on behalf of an agent of an enterprise, who in one embodiment may be occupying and using a workstation station in a communication center, such as, for example, station 121 of FIG. 1.

In the case of a call center agent the trust issues are considerably different from those of an independent person acting on his/her own behalf. This is because the agent is not acting on her own behalf, but on behalf of an enterprise, and the agent's purposes in communication are the purposes of the enterprise. For this reason, in one embodiment of the invention as shown in FIG. 3 an agent operates from a workstation 121 through a communication center infrastructure 303, which represents the communication center 103 of FIG. 1. Line 308 is in one aspect LAN 111 of FIG. 1. Trust authority 305 is connected in the same infrastructure, and may be in this embodiment also connected on LAN 111. In this case the trust authority need not be a third-party independent authority, because the trust issues for the agent may in most cases be managed within the enterprise.

For practical purposes the agent in the case illustrated by FIG. 3 is the enterprise. Communication between a person 302 and an enterprise agent 301 may be initiated by person 302, such as a customer of the enterprise, and in that case person 302 is likely seeking a service or seeking to buy a product offered by the enterprise. As an example, assume the enterprise is an insurance agency, and person 302 is seeking a policy for liability on an automobile. The agent's job is to determine the circumstances, and to determine whether or not to offer a policy on behalf of the enterprise, and if a policy is offered, at what price.

Of note before proceeding is that, if there is a configuration interface for the agent to configure interaction with the trust authority, the configuration will likely be simpler than that described above with reference to FIG. 2.

The negotiation between the agent and the person seeking liability insurance coverage will, of necessity, be multi-faceted. Firstly the agent needs to know what the person is seeking, and we have already assumed in this example that he is seeking liability insurance coverage on an automobile. Next the agent needs to elicit the person's identity and the identity (make, model, license number, etc.) of the vehicle for which insurance protection is sought. At this point trust issues emerge. When the agent gets the call, or even before, when the call registers at the communication center, a determination may be made by trust authority 305 as to initial trust level for the agent relative to the caller. Trust authority 305 is connected in the communication center infrastructure 303, which may have an extensive database (see element 110, FIG. 1) of existing customers, with profiles and history. Such archives are often called Statistics servers (StatServer).

Following this example the Trust Authority uses some identity information, such as elicited from the caller prior to his being connected to the agent, perhaps by an Interactive Voice Response (IVR) unit, or Automatic Number Identification (ANI) to cross-reference with the database and pull out, if available, a first look at the trustworthiness of the caller. Let us assume in a first instance that the database returns that the caller is not a current customer, but was a customer three years ago, and had not paid his premiums on time, and had tried twice to make false claims against a policy. The trust authority would return a "no trust" verdict. The trust authority in this case, or the database under management of other rules, may have made this determination in advance, and the trust authority need only retrieve the verdict, rather than do any calculation or reasoning. In this case the agent's display may have an indicator 309 similar to indicator 209 described in the embodiment referencing FIG. 2. In this example the indicator may be a red bar and of significant magnitude. In the case of a very bad trust indication, the agent may just quickly, but politely, end the contact, and go on to the next call.

Another situation may be that the trust authority, in response to the identity established, may return that this is a current customer with three policies, no near-term or outstanding claims, and fully paid up in premiums, and has never missed a premium payment. Big green bar for indicator 309, and the agent may proceed without trust issues.

In another instance, the trust authority may determine that the person calling is, or has been a client in the past, and the relationship, although not exemplary from the enterprise's viewpoint, is not all that bad, either. For example, there may have been a claim with a payout, but the indications were that the person was not really at fault, and the person has paid premiums faithfully, and has been cooperative in adjustment dealings. Indicator for first trust may be a short, green bar. In another instance the person may not have been all that great a client, but not bad, just at a balance point that the system cannot determine a red or a green, so a caution flag is displayed.

In every one of the above instances the agent may have access to a summary of the reasons for the initial trust indication. In one instance the person may not be found in the database. That is, this calling person is unknown to the system, therefore the trust authority is at a loss to assign a first trust indicator. In this instance the trust authority may make a quick check of available outside data sources. For this purpose trust authority 305 has an Internet connection 308 to access one or more sources for indicators, such sources indicated by server 310 in the Internet cloud. There may be a variety of sources that may be contacted, such as, for example, the California Department of Motor Vehicles (DMV) or a similar agency in another state which is derived from the ANI telephone number identification for the person.

A complete determination through outside sources for a trustworthiness indication for a caller having no history with the enterprise may take a while, so, for a first indication an in-depth inquiry may not be made right away. The "first look" may check the DMV, for example, and perhaps an on-line database maintained on an industry cooperative basis to share client experience amongst a group of insurance companies. The trust authority may make to the two-spot check and return a first indicator, and then continue in the background with a more thorough search, with perhaps periodic update to the agent as long as the agent is engaged with the caller. Even if the agent finishes with the caller, or the caller disconnects, the trust authority might continue a more in-depth check, and then cause that to be stored and cross-referenced in the stat-server or other storage to be available if the same person calls again, and perhaps is queued to a different agent, which would likely be the case.

Let is continue now past the first indicator, and functionality the trust authority may provide. Suppose, for example, the trust authority returns an ambiguous first trust indicator. The agent continues in back-and-forth with the potential client. For example, the agent, after the client is tentatively identified, and the automobile is identified, may investigate other avenues by queries to the caller. For example, the agent may inquire where the automobile is currently insured. If the caller answers it isn't insured, the agent is justified in asking why not, and the answer may be something that can be checked. The person may say he just purchased the vehicle, for example, and the agent may trigger the trust authority to check for transfer of tile. If there was no recent transfer of title, the agent has good cause to query further, and the trust authority may lower the trust score. There are a myriad such avenues a negotiation might take, and trust requires cooperative and truthful answers. An important function for the trust authority is to check the veracity of the caller's answers, and in some cases to suggest questions to the agent to further establish trust.

As negotiation continues, the trust authority may adjust the trust indicator, and at some threshold may determine (a) the person is quite trustworthy, and fix the bar at Big Green; or (b) the trust score falls below a threshold, and the indicator goes Big Red, and the agent is justified in declining representation.

There are a very large number of such examples that may be discussed for an in-house trust authority for aiding an agent in dealing with a caller. It is not necessary that the agent be an agent in a call-center or communication center. The same or a similar server and SW and circumstance may attain for an attorney interviewing a new, or retuning client, for example, or any professional representing an enterprise in negotiating with a caller on behalf of the enterprise. In just about all such cases an important function and feature of a trust authority will be providing a first-look trust indicator and then continuing or periodic update while negotiation with a caller continues.

In another aspect of a trust authority operating as a part of an enterprise, and perhaps aiding agents of that enterprise, the trust authority may have positive functionality for promoting trust for the enterprise from the viewpoint of callers to the enterprise. Thus far above in the context of trust from the viewpoint of an agent of an enterprise, the descriptions have concentrated on whether or not, and at what level, an agent (that is, the enterprise) may trust the caller. The inventors are aware as well that there may be positive functionality that could promote trust from the caller. For example, consider issues of visibility (alone) and visibility plus control. An enterprise might do a number of things beneficial to a caller, without the caller being at all aware of what is being done. For example, the enterprise may determine that the caller is an especially good customer, and therefore determine to advance the customer in queue (waiting), so the customer won't be exposed to a long wait time in queue, and this may be done entirely without the caller's knowledge.

In one embodiment trust authority 305 may determine that a caller may have reason to have some level of distrust, or may be a first-time caller, and there is good reason to engender or encourage a trust level for the customer. For example, if the trust authority, monitoring interactions of agents and calls, detects that a caller is, in fact, a first time caller, in the sense that first impressions are very important, may accelerate the caller for special service. Not all callers may be so treated, because available resources do not permit it, but a caller who is has a goof first experience with the enterprise is likely to develop a higher trust level for the enterprise, or agents acting on behalf of the enterprise.

In the case of a customer who has lodged a complaint in the past, or even one whom the enterprise itself has discovered may have been poorly serviced, a service acceleration can have beneficial effects for the enterprise. In some embodiments this may be completely transparent to the customer.

In another case the trust authority may extend some special service or benefit, and may make that visible to the customer. The purpose is to encourage a higher level of trust by the customer for the enterprise. The trust authority may, therefore, upon discovering the customer is a first time caller, cause the client to be routed right away to a special agent, and may announce this fact to the customer: "We are routing you immediately to our best agent for . . . "

In another case the trust authority may extend a special service, may make that visible to the customer, and may also give the caller some level of control. For example, the authority may offer to connect the caller to either agent X or agent Y, and there may be some obvious difference in the two agents (skill level, gender, etc.) and the caller is given some control: "We can connect you immediately with an agent-in-training, or, if you prefer, we can connect you with a more experienced agent in just under two minutes. Please indicate your pleasure (an interactive response mechanism is provided.)

Another aspect of trust in digital communication is in interactivity of an individual with an established network of persons. At times in a specification such as the present specification the word network is used to mean a physical structure, architecture or system, such as the Internet network, a telephony network, or a local area network. There is another meaning and understanding that must also be used in this specification. This is regarding groups of persons that are associated with one another, usually managed by software, such as social networks. Linkedin® was discussed briefly above, and this is a network of associated persons. This meaning of network is also incorporated in the notion of a group of agents operating on behalf of an enterprise. In that case a network of agents (associates) cooperate over a physical network, such as a local area network (physical), and sometimes over a wide area network (physical). The words are such natural and constantly used words of the art in telecommunications and all sorts of digital communications that it is not easy to avoid the use of the word in one context or the other; but the present inventors believe the context will resolve each use in this specification. If the authors believe some confusion might result, extra care will be taken to more fully explain.

Figure 4:
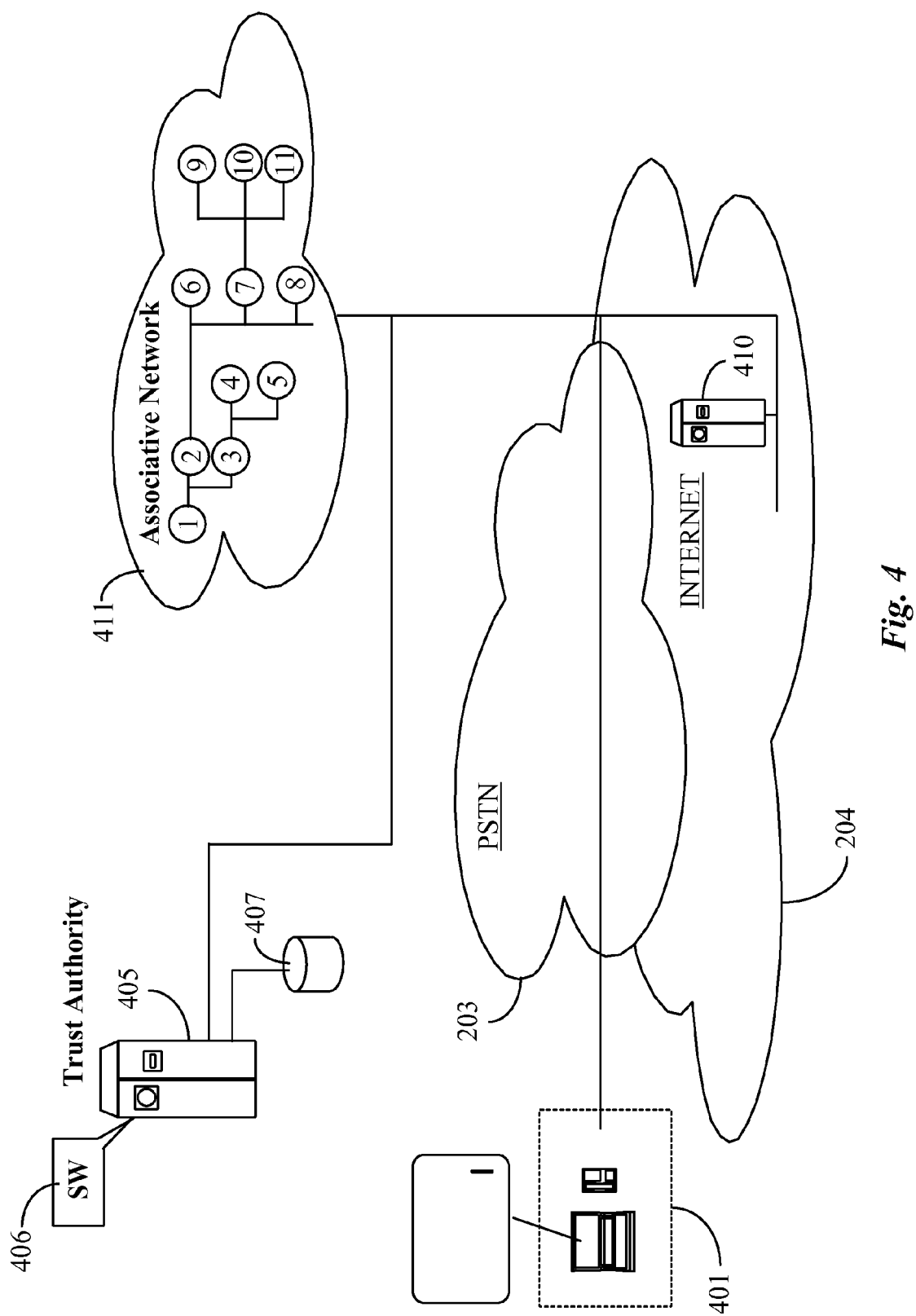
FIG. 4 is a diagram illustrating trust issues relating to an associative network in an embodiment of the invention.

FIG. 4 is a diagram illustrating interaction by an individual at a station 401 with a network 411 of persons associated with one another by some associative criteria. Such associative networks include a very large and growing number of social networks, such as, for example, Face-Book®, enterprise networks, some of which may be associated like social networks, professional associations like Linkedin®, and many, many others.

In some cases association is simply by contacts. Consider, for example, Skype®, the well-known peer-to-peer telephony network. Skype® allows users to set up contacts with either other Skype users or with other persons by cellular or land-line telephone. In the case of Skype-to-Skype, a contact of one person may very well have a plurality of Skype contacts as well. Consider that you are a user of Skype®, and you have several Skype® contacts. Those contacts may be considered your first-order contacts. The contacts of one of your contacts may be considered second-order associations, and there is a way that you may see those contacts, in some cases, with permission of other users. This relationship is displayed in associative Network 411, where member 1 has two contacts (or associates) 2 and 3. Member 2 has three associates 6, 7 and 8, and so on.

First we discuss the case where a user at 401 is a member of associative network 411, perhaps member 7, with associates 9, 10 and 11. Assume member 7 initiates digital communication with user 3. First order associations for 7 are 2, 6, 8, 9, 10 and 11. But the issue here is the instant communication that is initiated by 7 with 3. In this example a trust authority 405, executing trust SW 406 and coupled to data repository 407 is connected to associative network 411, which is managed by server 410 in the Internet physical network. In this case the person at 401 initiating contact into the social network is a member of the social network, and the trust authority is a creature of the social network as well. This can work in those situations where the social network has a stake in workable trust management between its own members.

In another aspect of the invention a trust authority may act as a broker to guide a member to trusted service providers. In this embodiment a person seeking, for example, to find a good tax person to help with preparing and filing a tax return. The trust authority may, as described to some extent above, have an extensive database of information about agents of all sorts, and professionals who offer their services for many things, such as tax preparation in our example. In this embodiment the person accesses the trust authority, identifies and authenticates himself, and responds to queries or menus in some fashion to make his need known: I need a trusted tax preparer. The interaction may be a bit deeper, with the authority asking some questions such as Business or Personal? Do you want a CPA, or do you prefer a tax attorney? What is the complexity level (further detailed questions)? Price range might be discussed as well. In the end the authority sorts and provides persons with a trust history (credentials and certificates may be shown). Then the person may contact the recommended person, and the trust authority continues to track, and may update it records about the professional chosen.

In another embodiment a trust authority may be a clearing house for persons offering services, and the trust authority may set standards for the service enterprises or persons who want to be members and offer their services through the authority.

In another aspect a trust authority acting on behalf of an individual, in addition to providing an ongoing trust indication, may offer suggestions and scripting to an individual, to guide the individual in dealing with agents and others. In this embodiment, as in some others described, the trust authority is listening in on the side of the individual subscriber. The trust authority provides certificates, if available, and initial trust indication, and continuing dynamic trust indication as a session continues, but in this new embodiment the authority takes into account the nature of the negotiation, and provides at least some scripting or suggestion to the person. For example, the trust authority may recognize an upsell or a bait and switch, or a rush situation, and may caution the person accordingly. This service is akin to the trust and behavior a person needs to place in his attorney in a deposition. The agent may ask: How much do you think you can afford? And the authority may trigger a flashing of the person's screen, or even a temporary muting of the person's response. In the case of a texting response (chat, IM), a delay in the transmission of the person's text response may occur. This may be paired with a suggested response, such as "None of you business".

In another embodiment the trust authority provides preplanning for the individual subscriber. For example, the individual may contact the trust authority, which will typically be through a web page and a secure log-in, and indicate to the trust authority a particular goal, for example: "I want to find someone to prepare my tax returns for last year." The trust authority in this embodiment has a Tax Program, and knowledge of professionals certified and licensed in tax matters. There are, of course, a variety of such persons of various sorts, such as accountants, attorneys and the like, and the authority provides an interactive interface where the subscriber can provide preferences. The trust authority then makes a best match to stored profiles, or provides a list of professionals that fit the profile input by the subscriber. The returns by the authority may include trust certificates, experience levels, and skills possessed by the professionals suggested. In one embodiment the trust authority provides in this regard an interface where a subscriber may provide feedback concerning that subscriber's experience with a professional suggested by the trust authority. This information (trust scores of other subscribers) may be made available when a subscriber negotiates for a professional for a particular service.

Figure 5:
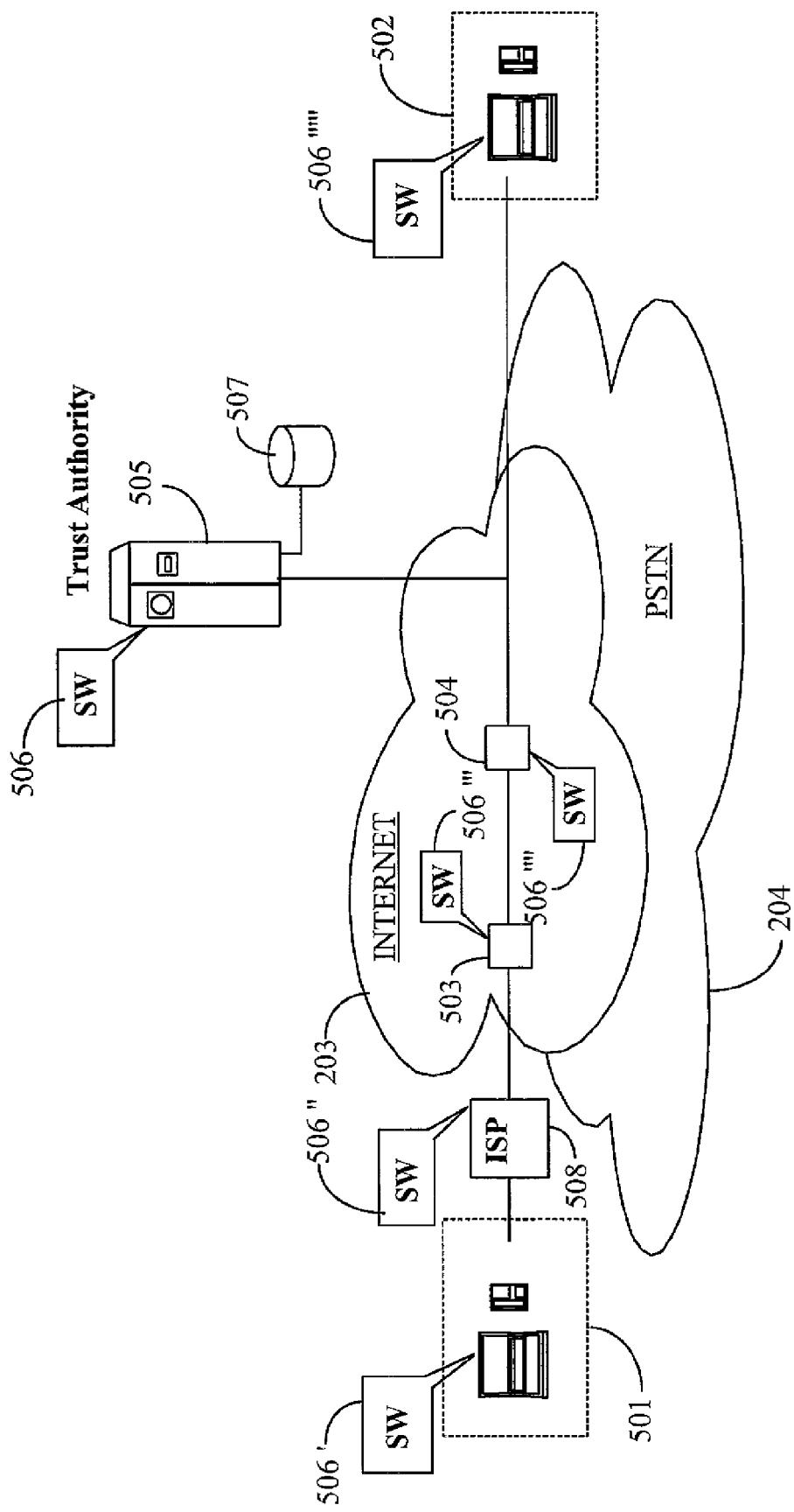
FIG. 5 is a diagram showing a workstation connected through the Internet in an embodiment of the invention.

In another aspect of the invention a trust authority exerts gateway control over documents under certain circumstances. FIG. 5 is a diagram similar to FIG. 2, showing a workstation 501 used by a individual in digital communication. The workstation may be enabled by a variety of communication appliances as discussed above for station 201 of FIG. 2, and the person using the workstation may communicate or transmit over any one, or a combination of the appliances, including a personal computer connected to a wide area network, like the well-known Internet network, telephones of various sorts over the Internet or other networks, and so forth.

Persons engaged in digital communication under a wide variety of circumstances are willing to share certain information with trusted communicants, which information may be shared by transmission of digital files. The files may be text documents or audio files. Examples are financial information (tax documents), medical information (diagnoses, X-rays), and many more. Such digital files are typically transmitted over a data packet network, like the Internet, in a (relatively) long string of data packets. A person using station 501 in this example is a subscriber to services at Trust Authority 205.

Referring to FIG. 5, station 501 is connected to the Internet through an Internet Service Provider ((ISP). ISP has become a broad term in the art, because the ways a computer may access the Internet have expanded in the near term, that is, there are many more ways of accessing the Internet than was true just a few years ago. But in a general sense the connection from the user's computer still typically passes through some intelligent apparatus and service which may be considered an ISP. For example, many cellular telephones now are capable of Internet access. But they cannot directly access the Internet. Connection to the Internet must be provided by the wireless service provider.

Once the computer at station 501 is connected to the Internet through ISP 508, data packets representing transmission of information originating at station 501 to some addressed destination (assume for sake of discussion station 502, which represents in this example any destination), must pass through a series of Internet packet routers, such as node 503, which may be what is known in the art an edge router, and node 504, which may be what is known in the art a core router.

The computer at station 501 is a machine-intelligent device executing machine-intelligent software stored in a machine-readable medium accessible to a processor in the computer. The same is true of ISP 508, which may be a system of several computerized servers. The same is true of edge router 503 and core router 504, as well as Trust Authority 505 and computerized appliances at destinations 502. A file transmitted to station 501 to a destination 502 will pass, typically as a more-or-less serial string of data packets, through a series of intelligent devices.

In the present aspect of the invention individual ones of the machine-intelligent devices may cooperate with Trust Authority 505 to provide services to a person using station 501. Trust authority 505 executes a software suite termed SW 506 in this example, stored in a machine-readable medium, which may be repository 507. Station a computerized appliance at station 501 executes SW 506', which provides functionality in concert with the Trust Authority. ISP 508 may subscribe to Trust Authority 505, and may execute software 506", which provides functionality in concert with functionality of the Trust Authority. Similarly, edge router 503 may cooperate with the Trust Authority through SW 506''', core router 504 through SW 506'''', and destination 502 through SW 506'''''.

In one embodiment of the invention, if a person at station 501 composes an email and addresses same to destination 502, and attaches a file to the email, under certain circumstances the attached file may be tagged as a high-security file. The attachment may be, as discussed above, sensitive financial information. In one embodiment the person at station 501 may tag such files by placing them in a folder controlled by SW 506', or such files may be tagged as sensitive information in some other manner. In any case, such files are tagged in a format known to, and controlled by Trust Authority 505. The tag may be considered a Trust Certificate.

So the person at station 501, a subscriber to Authority 505, composes an email to his tax attorney at destination 502. The attachment is trust-tagged by SW 506'. This may mean that every packet prepared and transmitted is tagged as well, using one or more data-packet fields, either existing or created for this purpose. SW 506' cooperates with Authority 505, at the time the email is sent, or leading up to its being sent, to check that the addressee is actually the tax attorney to which the subscriber at station 501 contacts.

Email accounts are typically handled by an ISP, but emails and attachments to emails pass through, as described above, a series of nodes, or stations on their way from a source to a destination. As a trust measure, sensitive information sent as files can be tracked and treated theoretically at any station along the route, if that station is enabled to do so, such as by software provided by and working in concert with Authority 505. So, if one or several intelligent stations along a path can check, in this example, an email for source and destination, and also for certification of attachments, then a number of trust services may be performed.

In this example there is a relationship between the sender, the intended recipient and the attachment. This relationship is set up before the email is composed and sent, by intent of the sender through SW 506'. So the email may be tracked along the way, and any diversion stopped or reported, or any anomaly may be reported back to the sender, who may be queried for further instruction. Anomalies might include discovery of an email with the attachment, but to a different intended recipient. The sender may have mistakenly marked the email to be copied to another person other than the planned recipient; and the system of gateways created by Authority 505 working with any one of the intelligent nodes along the way may correct the error by parking rather than forwarding the email, deleting the email, or some other corrective measure.

In a further embodiment packet-routing nodes, such as edge router 503 and core router 504 may take other action on behalf of the subscriber. Such packet routers typically are connected to a plurality of adjacent routers, and there is typically a plurality of paths that data packets may follow from a source to a destination. Selection of the next hop for any packet at a node in the network is made according to a rule set, such as Shortest Path. Propagated information about the present state of the network is also used, so if one channel to an adjacent node along a possible path is down, an alternative path may be selected, and the packet will be routed by the alternative path.

In an embodiment of the present invention Authority 505 stored information about trusted paths, those paths upon which fewest faults and problems exist, and those paths that are least subject to various insecurities that may be practiced in the network. It may be, for example, that certain paths in the network are through jurisdictions in which government policy causes insecurity or minimum trust. Certain paths may be over a wireless jump or a satellite link. Authority 505 may exert at least gross gateway authority at certain points in the network to cause the packet router to forward packets for transmissions from subscribers to the Authority over preferred paths, if those paths are available, or to delay a transmission at some point and ask the sender for a decision about continuing. In this aspect of the invention the trust authority may maintain a continuing interactive relationship with a number of network routing nodes, and may keep a frequently updated map of network active topology, and may also keep at various levels information about trust levels for various paths, not just from node to node, but for frequent sender to recipient gross paths associated with individual subscribers, and may exercise the authority and influence described above for individual transmission of subscribers.

Knowledge of trusted paths is not restricted to the Internet, although the Internet is used in examples above, but may be determined and stored, and also frequently updated for various networks, and associated with individual subscribers. Such as, for example, a particular subscriber may make telephone calls to a particular enterprise that has a network of call centers. Such calls frequently go to a toll-free destination (like an 800 number), which is often termed in the art a service control point (SCP). The SCP then routed the incoming calls to one or another of the call centers, bases typically on Enterprise rules or preferences. In this embodiment trust authority of the sort described in many embodiments in the disclosure may maintain an interactive relationship with SCPs, and may therefore influence, for example, which to call center calls incoming from particular subscribers may be routed. This relationship and functionality is not restricted to just certain sorts of networks.

So in one embodiment of the invention the trust authority (505) exerts influence over transmissions in the network. The Internet transmitting an email was used above as an example, but this is certainly not the only example that might be described. As another example, a subscribing person may open a texting session and prepare and send an Instant message, a voice file, or any other sort of transmission. The subscriber may set the session to be Trust Protected, and versions of SW 506 along transmission routed will then exert influence over the communication, transmission and/or attachments, monitor for unwanted anomalies or piracy of any sort, and take corrective action, and exert influence over choices of transmission paths.

In the instance described above of tagging files, the tags need not be single level tags. The tag, or trust certificate, may be a dynamic tag, such that levels of trust are established by the certificate. Persons who may have access to such tagged files in this embodiment may have to have a clearance certificate to be able to read or hear the document. Medical information may be shared with a doctor at a medical institution, but the tags may prevent non-medical persons at that institute from reading (viewing) or hearing the file or files. In another embodiment portions of information in a single file may have different trust levels, and those portions become understandable to persons depending on their trust certification. Documents are automatically redacted differently for different persons, of voice files may be muted at certain portions differently for different persons.

Figure 6:
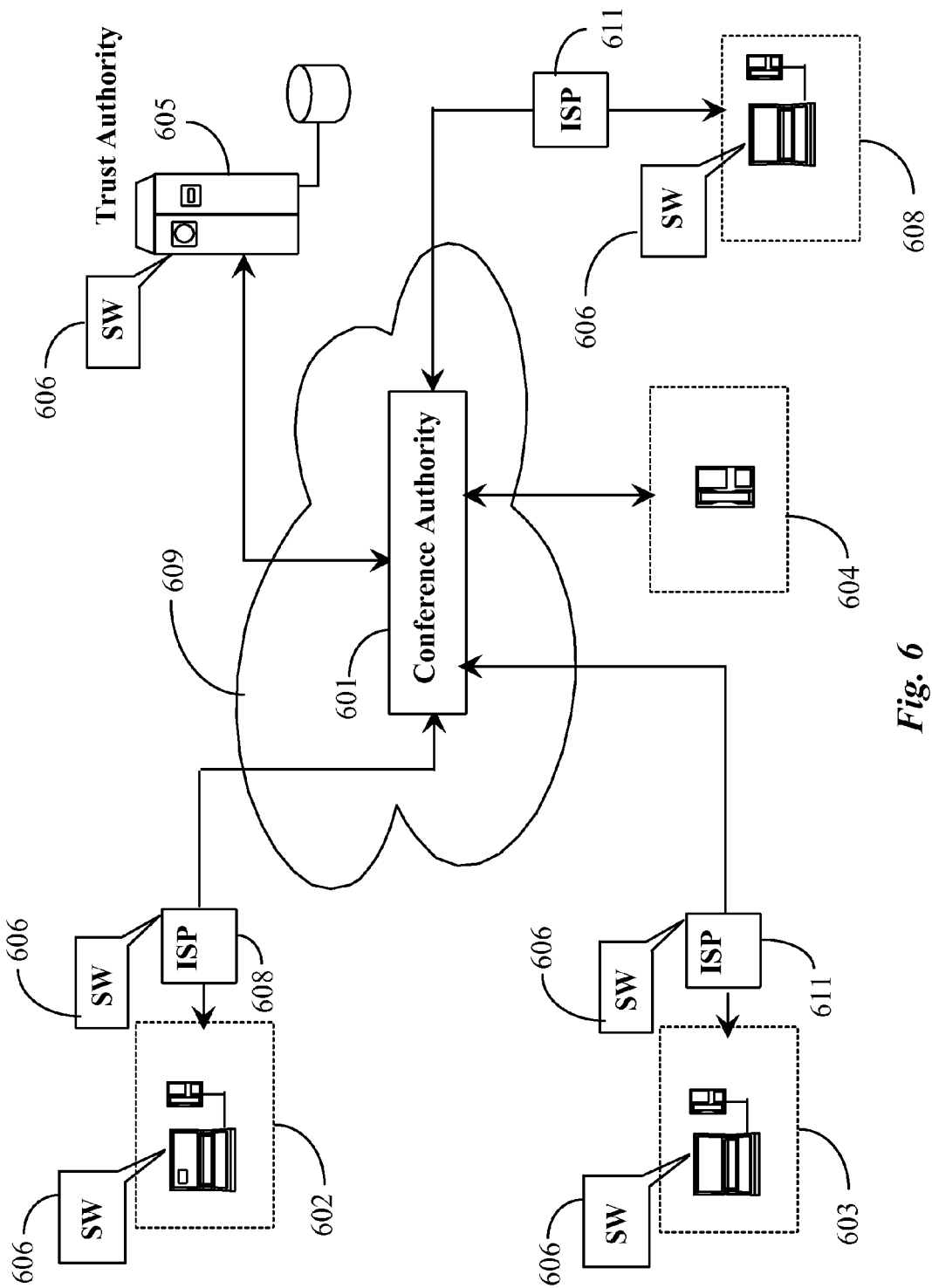
FIG. 6 is a diagram illustrating a conference situation in an embodiment of the invention.

Trust in Conference:

An important area concerning trust in digital communication is in the area of conferencing, such as video and audio conferencing. FIG. 6 is a diagram of a conference situation in which four persons are engaged. Cloud 609 simply indicates the joining of the four persons in conference through their respective equipment, and the variety of connections through which transmissions may pass through a variety of networks to accomplish such a conference.

Stations 602, 603 and 608 are stations including both a computer and a telephone device, and each is connected to a conference authority 601 through an ISP 611. The telephone device at these stations is shown connected to the computer, and is meant to represent any sort of voice communication ability that may be implemented, along with data capability through the computer. In some cases the telephone may be connected to the conference authority through a wireless network such as a GSM network, to a PSTN, or by VoIP. There are many possibilities, all known to the skilled artisan, and the representations made are intended to encompass all such connectivity and coupling known in the art. Station 604 is a telephone station, and the person using that station is limited to voice communication with other participants. This telephone may be of any wireless or land-line sort.

Conference authority 601 represents an intelligent conferencing facility often termed a bridge in the art, which is a grouping of servers executing software from machine-readable media, and having connectivity to all of the networks that may be used by conference participants. Conference authority 601 is in many cases quite complex, but such conferencing authorities as they exist in the present art are known to the skilled artisan.

For the purpose of the present example assume that four persons using the stations illustrated have joined in a conference concerning health issues regarding one of the persons, that person engaged in the conference using the telephone-only station 604. The other three participants, using stations 602, 603 and 608 are medical professionals, one (602) the general care physician for the person at 604, another (603) an oncology specialist invited by the physician at station 602, and the third (608) a radiologist.

A unique departure from conventional technology in the present example is association of trust authority 605 with conference authority 601. In one embodiment trust authority 605 may be an integral part of conference authority 601, that is these two authorities may be hosted and a part of the same enterprise. The hosting enterprise might be one of the well-known Internet service providers, or one of the large and well-known telephony network providers, or a joint venture of more than one such host. In another embodiment the trust authority may be a third-party enterprise to which the conference authority subscribes, and to which individual ones, or all of the conference participants may subscribe as well.

The conventional operation of authority 601 is that participants may all hear one another in the conference via voice capabilities of the appliances through which they are connected to the conference, those with computer equipment connected to the conference, depending on their software and functionality of the conference facility may be able to view and exchange information via computer display, and those having video equipment and software compatible with the conference equipment and software may be able to see as well as hear one another. This functionality is the principle purpose of conventional conferencing functionality.

In the present unique example trust authority 605 provides a range of trust functionality not available in conventional conferencing functionality. For the sake of the present example, which is but one example of many that might be described, assume that trust authority 605 through SW 606 and instances of SW 606 executing on various processors in equipment at the conference authority and at the stations used by participants, establishes a rule set for the conference. The trust authority might have a variety of useful rule sets applicable to different sorts of conferences, and the person who sets up the conference might select one of these, or at least indicate certain preferences to the trust authority, which might then determine which rule set to use.

The present exemplary conference is a medical conference, and the subject of the conference is a person at station 604, whose family physician is using station 602. More particularly the conference is about diagnosis of an abdominal tumor found in the person at station 604. A particular purpose of the conference is to determine diagnosis, that is, is the tumor malignant? And another purpose is to discuss, and at least present alternative treatment options.

All of the participants have logged into the conference. In some rule sets that may be imposed there are special reasons for being sure that the participants are who they say they are. So there may be special codes beyond the log-in, or Q&A sessions at log-in to be sure the participants are in fact trustworthy to the extent that they are who they represent themselves to be. In the rule set imposed for this conference functionality is provided that recognizes trust scores for individuals, and makes it possible that the usual functionality of all the participants being able to interact (see, hear, share) with all the others, at least to the extent of their equipment, may be altered, such that there may be side communication between two or three participants that is not available to one or two or three of the other participants.

It was described before that trust is often a one-way street. This means that one of the participants may trust another at a very high level, but that the other of that pair may not have exactly the same trust level for the first. As an example, the person with the tumor at 604 may trust his family doctor at station 602 completely; on a scale of 1-10, a 10. This means that the person at 603 is willing to share any and all information, opinions, fears, expressions, and so on with the doctor at 602. But the doctor at 602 may have had some difficulty with the patient in the past, the nature of that difficulty is not terribly important to the example, and may want to be a bit circumspect with the patient under certain circumstances. The doctor's trust score for the patient is 8.

Similarly, each person in the conference may have a trust level for each other person in the conference, which translates to twelve trust scores for the four participants. Moreover, the trust scores each person has for another may be topical. That is, the doctor may trust the patient completely (10) for fiscal issues (the patient always pays and is well-insured), but not so much for the patient's ability to provide truthful and thoughtful indices of health (the person may be a bit of a hypochondriac). So the trust level between persons in a conference may be more complicated and not static, as it may be issue-related, for example. Further, trust level between participants may not be static, but may be changeable during a conference.

It is important that trust level in the sense being here described is not a feeling or opinion of one about another, although it may be related to that feeling or opinion. It is rather a score associated with the other person by any one of the participants. In some cases there may have been prior interaction between the participants, and both may be subscribers to, or at least known to the trust authority. "Known to" means the trust authority has information about a person, and is capable of associating a trust score with that person. In this circumstance the trust score one participant associates with another may be already known and applied by the trust authority. In another circumstance one of the participants may be new to the trust authority, and the trust authority may apply a default score on behalf of a subscriber, based on the other participant's log-in authenticity, medical specialty (in this case), or some other information that may be quickly ascertained from perhaps an external (to the trust authority) source. The trust authority may, for example, at the beginning or early on in the conference, check whether the radiologist at station 608 is registered with another authority that ranks such professionals, and what that ranking might be.

So it is seen that trust scores may be established and assigned in a variety of ways for purposes of managing interaction in the conference. These trust scores may be pre-assigned, created by default, or created by conference participants in a back-channel to thrust authority 605, and scores may be altered during the conference by the trust authority and participants who have access to functionality to change such scores. The scores are used by the trust authority in managing functionality in the conference.

Assume now that three of the four participants in FIG. 6 have logged into the conference, as invited, and have authenticated themselves, and the three are the person with the tumor at station 604, the family doctor at station 602 and the oncologist at station 603, who was invited by the family doctor. The family doctor at 602 was the initiator of the conference. The radiologist is not in the conference when it begins, but will be invited later.

One functionality enforced by the rule set imposed is that a certain minimum trust score is required to participate. If a trust score does not measure up, that person may be blocked by the conference, dropped, that is, with all communication with and through the conference authority removed. If a participant with an initially passable trust score has a score changed, that participant may be dropped. Assume, for example, that the conference starts, and the oncologist at station 603 has an initial trust score that passes, but that the trust authority soon discovers that person is not registered at a particular site, but had indicated she was, the trust score is lowered and the oncologist is dropped. This may end the conference, but it may not. The family doctor might invite another oncologist to join, who may prove to be available and have adequate trust scores that hold up on further checking by the trust authority, and the conference may continue.

Assume now the oncologist is replaced, and the family doctor, in nominal control of the conference has digital files of MRI scans of the tumor area of the patient, and proposes to share one or more of the files with the newly arrived oncologist. Firstly, the MRI files in this instance have been pre-registered with the trust authority, and the files have a trust certificate. If the family doctor posts the files to the conference the trust authority checks the trust certificate, and the trust level of the oncologist. If there is a discrepancy, the files may be blocked in transmission, or parked (cached), and a query posted to the family doctor. The family doctor may have authority to over-ride the block, if the personal trust relationship between the doctor and the patient is high enough, otherwise not. Assume in this case that the blocking problem was caused by the fact of the second oncologist being new to the conference, replacing the first one, and his trust certification has not yet been thoroughly checked. The authority may post to the family doctor the fact of the block, and a time estimate for checking out the oncologist. The family doctor informs the patient of a slight delay, and in a minute the trust authority upgrades the oncologist's score to above the threshold, the block is lifted, and the family doctor is informed.

Now the oncologist may load and view the MRI files, which may also be visible to the family doctor on her computer display, but the patient, of course, being connected only by telephone, cannot see the MRI files (and likely need not see them). The family doctor has an interactive control window posted by the trust authority (no other participant has such a display window), through which she may quickly initiate side-channel communication. Other participants may have a similar interactive window through which they may request such side-channel communication, but they may not initiate and block such communication.

In this example the oncologist, having looked at the MRI scans for a time, may request through his query window a side-channel with the family doctor, who grants it, and the oncologist says to the family doctor that he has an opinion, but there is a particular radiologist he would like to consult about one issue before rendering that opinion. He provides what contact info he can for the radiologist. The family doctor contacts the radiologist, who logs into the conference at station 608, and passes the usual drills imposed by the trust authority. The radiologist has communication with just the oncologist in this case, not the family doctor or the patient. Also the radiologist has no information at all about the identity of the patient, and has access only to certain parts of the MRI needed to answer the particular question in the uncertainty area of the oncologist. In this case imaging that the question has to do with a particular shape of the tumor, in which the radiologist happens to be a world-class expert.

After the radiologist renders his opinion, he is disconnected from the conference. Now the oncologist signals to the family doctor that he is ready to render his opinion, the family doctor enables a side-channel, and the oncologist informs the family doctor he strongly believes the tumor is, in fact, malignant. In the side channel discussion the family doctor inquires if he has opinions about treatment, and if he would be so kind as to share with the patient. He says he will, so the family doctor enables three way sharing, and leads the discussion with the patient, informing of the findings, treatment options, and the like.

This, as described above, is but one of a very large number of examples that might be described, but should be sufficient to explain functionality of the trust authority aspects of conferencing in embodiments of the present invention. Trust scores and certificates may be used in some aspects to provide motivation to participants, who may make decisions based on the scores. Such as, for example, if the second oncologist had a marginal trust score, the family doctor may have chosen not to invite him to speak directly to the patient. Such scores and certificates operate in other instances to enable or block certain communication automatically. The radiologist must have a sufficient trust score, his standing with the trust authority in this case, to even see the portions of the MRI files.

Various additional functionality may be provided in conferences by the trust authority, as well, such as an ability for one participant to have a back-channel communication with another while the conference is ongoing. As an example, assume in the medical conference described that the oncologist has accepted the family doctor's invitation to speak directly with the patient, and the three-way voice communication has started, but the family doctor (controlling party) is suddenly shocked by what the oncologist is saying, or about to say. The family doctor may have an ability to signal the oncologist without just blocking his voice, which might be upsetting to the patient. Such a signal might be a STOP icon, a phrase prominently displayed, such as "get off that", or the family doctor may establish a whisper back-channel to be able to speak to the oncologist, even while the oncologist is talking, and without the patient hearing the whispered message. The family doctor might say "Please don't talk about dying to this patient, leave that to me." The oncologist should be able to catch the message and adjust his monologue without missing a beat.

Also, as described above, trust certificates may be applied to files and documents, and the nature of the certificates might filter contents so that only portions may be heard or become visible, depending on trust level of potential viewers, or other circumstances.

Further to the above, trust levels may be transitive; that is, the patient might set a trust metric with the trust authority that he will trust anyone she trusts, and even anyone the a person she trusts also trusts, and so on. The transitivity may also be made conditional, in that the patient might choose to trust associates of the family doctor in a fully transitive way, based on the single condition that the trust authority does not have a reason to veto that trust. There are other sorts of conditions that might apply as well. It also should be noted that trust is seldom symmetric; that is, the trust of a first participant for a second may be quite different than the trust of the second person for the first.

Referring again to FIG. 6, some of the participants are subscribers to trust authority 605, and may execute versions of software 606 as shown using computerized appliances executing the software from machine-readable media. In this case some participants may store and use trust scores at their own computers, and execute some trust functionality from their own computers as well.

Participants in a conference, such as described above with reference to FIG. 6, may, as mentioned above, be subscribers to the trust authority associated with the conference. Other participants may not. In any case, the trust authority in some embodiments may extend an interactive configuration interface to such participants as may be equipped to display and use the interface, and certain options may be provided. For example, there may be one or more participants who do not wish to be trusted, that is, they may not care to be responsible for knowledge of information that might otherwise be transmitted to them. These persons may select in such an interactive interface to block sensitive incoming documents or other transmissions, and may also select to have a record made that they did not receive such sensitive or proprietary information.

Control over incoming information as described just above for conference participants may also be extended to individuals communicating through a network (or a mixture of networks) with one or more other persons, and such functionality may be provided through, for example, configuration interface 208.

In another aspect of the invention there may be situations wherein a participant may want or need to override a decision of the trust authority. For example, the radiologist invited to participate in the conference at station 609 may be assessed by the trust authority to fall a bit short of the level of trust expected to participate under the particular rule set in place for the conference. It may be, however, that this radiologist is the only one available, and there is a dire need to complete the purpose of the conference. In this circumstance there may be facility for the chairperson of the conference, in this case the family doctor, to override the decision of the trust authority. This functionality may be in an interactive interface available to the chairperson of the conference. In some cases the chairperson may consult, on a side channel, with the patient at station 604 for authority to do so. In some cases the override may be visible to communicants, and in other cases not.

In some embodiments a trust authority like TA 205 of FIG. 2, may take on a risk/liability business model. For example, in the case of the TA providing a brokerage for professionals to market their skills, there is a certain risk, and assumed liability by the trust authority. The trust authority must, in this case exert a great effort to be sure that people they manage and recommend are in fact, very trustworthy. In the case of this business model the trust authority may issue an agreement to be signed by persons who seek to enlist the services of represented professionals, the agreement spelling out risks and liabilities.

There may be, in some instances, some confusion between competence and honesty in determining trust scores and certificates. Competence in this instance is more related to skills. That is, can we expect (trust) the person to exercise represented skills. It is perfectly conceivable that a person may be skilled in a certain area, but may not always competently exercise those skills. Honesty is a bit different. A person may be skilled, and competent, but dishonest. Dishonesty may be selective or general.

Several instances of determining and assigning trust scores have been described above. In various embodiments of the present invention there are a number of novel ways in which trust scores may be established. Firstly for example, in the case of physical networks, it is well known that a path through a physical network from a source to a destination is typically over a series of hops. These hops may all be in one network, like the Internet, for example, but may in many instances be a series of hops in one network followed by a series of hops in another, and then perhaps in yet another. For example, a person may initiate a voice call from a cellular telephone to a person at a computer connected to the Internet, and enabled to handle Internet Protocol Network Telephony (IPNT) calls. The call goes on a wireless network to a base station (one hop), from the base station to a wireless central facility (second hop), perhaps through a PSTN to a bridge, and then from the bridge into the Internet as a IPNT all terminated finally at the destination computer.

Based in a variety of information available to a trust authority, and following a variety of possible protocols and rationale, trust scores may be assigned to individual hops; some of which may be more secure and more trusted than others. Based on the trust scores determined for the individual hops (or legs) of a transaction may be assigned a composite score.

An interesting and unique aspect of trust scoring relates to use of filters. Referring again to FIG. 2, a person using station 201 may subscribe to a trust authority 205, and that trust authority might store information, as described above, for a plurality of persons that may, at least in one instance, be agents of one or another enterprise. In one instance, the trust authority may provide an interface for subscribers to input opinions and ratings regarding other persons. Any subscriber may then have access at the trust authority to ratings and scores associated with these other persons.

In an additional functionality the trust authority might also associate each input rating a person with identity, or at least a profile, of the person providing the rating. So the rating provided will then be associated not only with the person rated, but with the person providing the rating. Now consider that a subscriber may configure a filter for treating, that is filtering, the ratings at the trust authority, instead of just accepting the composite rating that may be made from the variety of people who contributed. The filter may, for example, specify that the subscriber wants a composite rating for someone, but also wants any contribution made to that rating by a particular third party to be excluded. The subscriber may be aware, for example, of certain people who rate others quite higher than the individual subscriber would rate.

In this embodiment a composite rating may be available for a particular person, but in the event of a filter application I place for a particular subscriber, the trust authority will recalculate based on the filter.

Filters might be quite more complicated than the example just provided. For example, the filter might provide a screening that excludes any agent that has worked for a particular enterprise, and any rating input from any agent that has worked, or currently works for a particular enterprise. The filter might specify in some manner that I want ratings made by people like me, and in this case the trust authority may have a variety of sample profiles for "like me".

In some aspects persons may be unwilling to make specific ratings explicitly, but may be willing to indicate a level of satisfaction, or other indication of an experience with an agent or with an enterprise. In such cases a trust authority may have a software agent that relates the experience indicators to trust scores, that is, the trust authority normalizes the input into a digital representation. In some other aspects there may be machine intelligence created and used to assign trust metrics on a passive basis of observation. This may take the form of a software agent executing on station 201 (FIG. 2) for example. The software agent might be programmed in the case of voice communications to observe and make record of indications, such as length of sentences used by a communicant, inflection in utterances, volume compared to content, and other indications in speech of the attitude and sincerity of the speaker. The records made may then be used by the software agent to assign trust scores to persons engaged in voice communications.

In the case of text a similar software agent may analyze sentence structure and the like to also assess a trust metric. In the case of text, certain phrases and sentences used by a communicant might indicate a trust metric. Such sentences and phrases might be mined from text used by persons known to be not trustworthy.

A variety of examples and embodiments have been described above, and these are exemplary only. It will be apparent that there are many other aspects, not explicitly described, but which are suggested by the examples, and fall within the scope of the invention. Further, many of the embodiments describe functionality provided by software, and it is noted that in every case of software functionality described in this specification, the software is executed by a processor in a computerized appliance, such as a personal computer, an Internet-connected hardware server, or a handheld device, and the software is executed from storage in a machine readable physical medium.

The invention is limited only by the scope of the claims that follow.

The invention claimed is:

1. A trust authority for assigning to a person, file, or network path associated with a communication conducted during a single interaction session between at least an end user device and at least one other work station or other computing device, an indication of trustworthiness, the trust authority comprising:
  a processor;
  a memory, wherein the memory has stored thereon instructions that, when executed by the processor, cause the processor to:
    assemble, at the trust authority, information concerning the person, file, or network path;
    determine, at the trust authority, a first trust score in response to the assembled information, wherein the first trust score is personal to a specific user, and wherein the instructions that cause the processor to determine the first trust score include instructions that cause the processor to retrieve, from a data repository coupled to the trust authority, or from the end user device taking a form of a computerized appliance, a profile of the specific user with information on trust rules to follow for the specific user;
    provide, from the trust authority to the end user device, and in response to the determined first trust score, a first indicia indicative of the first trust score of the specific user for the person, file, or network path, for output on the end user device accessible to the specific user;
    as the communication progresses during the single interaction session, identify, by the trust authority, additional information associated with the person, file, or network path;
    determine, at the trust authority, a second trust score in response to the identified additional information;
    provide, from the trust authority to the end user device, a second indicia indicative of the second trust score for output on the end user device; and
    perform, by the trust authority, an action causing a change at the end user device, or at a router in the network path, based on a difference between the first trust score and the second trust score, wherein the communication transmits the file, wherein the first and second trust scores relate to the file, and wherein the first and second indicia are visual indicia for display on the end user device.

2. The trust authority of claim 1, wherein anomaly associated with the file is detected when the file is addressed to an incorrect intended recipient, and the first or second trust scores are reflective of the anomaly.

3. The trust authority of claim 2, wherein, in response to detecting the anomaly, the instructions cause the processor to park the file within the network.

4. The trust authority of claim 3, wherein, in response to detecting the anomaly, the instructions cause the processor to report to a sender of the file and query the sender for further instructions.

5. The trust authority of claim 1, wherein the file propagates through a plurality of nodes within the network path.

6. The trust authority of claim 5, wherein anomaly associated with the network path is detected when a node of the plurality of nodes within the network path is down.

7. The trust authority of claim 6, wherein, in response to detecting the anomaly, the instructions cause the processor to route the file via an alternative network path.

8. The trust authority of claim 1 further comprising a data store, wherein information about a plurality of network paths is stored in the data store.

9. The trust authority of claim 8, wherein the information comprises trust scores assigned to each of the plurality of network paths.

10. The trust authority of claim 9, wherein the trust scores are based on a number of insecurities and a number of faults that occur within each of the plurality of network paths.

11. The trust authority of claim 10, wherein the instructions cause the processor to update the trust scores of each of the plurality of network paths.

12. The trust authority of claim 11, wherein the instructions cause the processor to route files along network paths of the plurality of network paths that are assigned trust scores of at least a threshold value.

13. The trust authority of claim 1, wherein an anomaly associated with a person that receives the file is detected when the person does not have a required level of clearance associated with the file.

14. The trust authority of claim 13, wherein, in response to detecting the anomaly, the instructions cause the processor to regulate access to the file by the person receiving the file.

15. The trust authority of claim 1, wherein the action comprises dropping a participant.

16. The trust authority of claim 1, wherein the instructions further cause the processor to:
assign a trust value to a first contact; and
assign a trust value to a second contact as a contact of the first contact based on the trust value assigned to the first contact.

17. A method of operating a trust authority for assigning to a person, file, or network path of a network associated with a communication conducted during a single interaction session between at least an end user device and at least one other work station or other computing device, an indication of trustworthiness, the method comprising:
assembling, by a processor of the trust authority, information concerning the person, file, or network path;
determining, by the processor of the trust authority, a first trust score in response to the assembled information, wherein the first trust score is personal to a specific user, and wherein the determining of the first trust score includes retrieving, from a data repository coupled to the trust authority, or from the end user device taking a form of a computerized appliance, a profile of the specific user with information on trust rules to follow for the specific user;
providing, by the processor of the trust authority to the end user device, and in response to the determined first trust score, a first indicia indicative of the first trust score of the specific user for the person, file, or network path, for output on the end user device accessible to the specific user;
as the communication progresses during the single interaction session, identifying, by the processor of the trust authority, additional information associated with the person, file, or network path;
determining, by the processor of the trust authority, a second trust score in response to the identified additional information;
providing, by the processor of the trust authority to the end user device, a second indicia indicative of the second trust score for output on the end user device; and
performing, by the processor of the trust authority, an action causing a change at the end user device, or at a router in the network path based on a difference between the first trust score and the second trust score, wherein the communication transmits the file, wherein the first and second trust scores relate to the file, wherein the first and second indicia are visual indicia for display on the end user device.

18. The method of claim 17, wherein an anomaly associated with the file is detected when the file is addressed to an incorrect intended recipient, and the first or second trust scores are reflective of the anomaly.

19. The method of claim 18, further comprising, in response to detecting the anomaly, parking, by the processor, the file within the network.

20. The method of claim 19, further comprising, in response to detecting the anomaly, reporting, by the processor, to a sender of the file and querying, by the processor, the sender for further instructions.

21. The method of claim 17, wherein the file propagates through a plurality of nodes within the network path.

22. The method of claim 21, wherein an anomaly associated with the network path is detected when a node of the plurality of nodes within the network path is down.

23. The method of claim 22, further comprising, in response to detecting the anomaly, routing, by the processor, the file via an alternative network path.

24. The method of claim 17, wherein the trust authority further comprises a data store, wherein information about a plurality of network paths is stored in the data store.

25. The method of claim 24, wherein the information comprises trust scores assigned to each of the plurality of network paths.

26. The method of claim 25, wherein the trust scores are based on a number of insecurities and a number of faults that occur within each of the plurality of network paths.

27. The method of claim 26, further comprising frequently updating, by the processor, the trust scores of each of the plurality of network paths.

28. The method of claim 27, further comprising routing, by the processor, files along network paths of the plurality of network paths that are assigned trust scores of at least a threshold value.

29. The method of claim 8, wherein an anomaly associated with the person that receives the file is detected when the person does not have a required level of clearance associated with the file.

30. The method of claim 29, further comprising, in response to detecting the anomaly, regulating, by the processor, access to the file by the person receiving the file.

* * * * *